Sept. 16, 1958 R. E. BASSETT, JR 2,852,423

SHIELDING ADHESIVE TAPE

Filed March 18, 1955

INVENTOR

Rex E. Bassett, Jr.

BY Cameron, Kerkam & Sutton

ATTORNEYS

United States Patent Office 2,852,423

Patented Sept. 16, 1958

2,852,423

SHIELDING ADHESIVE TAPE

Rex E. Bassett, Jr., Fort Lauderdale, Fla., assignor to Bassett Research Corporation, Detroit, Mich., a corporation of Michigan Application March 18, 1955, Serial No. 495,269

1 Claim. (Cl. 154—53.5)

This invention relates to improved shielding means designed to be applied about lead-in wires and conductors on radios, radio telephones, television sets and other electronic apparatus to shield the said conductors from extraneous outside electrical currents which interfere with proper reception and cause static and other objectionable effects.

It has been usual in the past to apply various types of metal coverings about such conductors to intercept and shield the conductors from such outside electrical disturbances. Various types of metal foils have been used with varying degrees of success but due to their low structural strength and the difficulty of maintaining them properly in position they have not proved satisfactory.

The present invention therefore contemplates the provision of an improved shielding tape which is of increased mechanical strength and which is provided with an adhesive surface to assure its maintenance in proper position about the structure to be shielded after it has been applied thereto. The improved shielding tape is provided with metal peripheral strips extending along its edges adjacent the adhesive portion thereof to insure the continuous electrical contact of the metal surfaces of the strip.

Broadly, the invention comprises a pressure sensitive tape, both surfaces of which are adhesive, to one surface to which is applied a metal foil strip of greater width than the adhesive tape, the lateral edges of the foil strip being bent upwardly and inwardly over the edges of the adhesive tape to provide narrow conducting surfaces extending the length of the adhesive strip along both of its lateral edges.

As an alternative, a strip of metal foil may be provided with a longitudinally disposed adhesive coating so applied that the edges of the foil strip extend outwardly beyond the adhesive coating. These peripheral edges may be bent upwardly over the edges of the adhesive strip to provide a tape of improved mechanical strength.

Due to the provision of the adhesive surface on the conducting foil the improved shielding tape may be readily applied about any surface to be shielded and will be maintained thereabout permanently in the desired position without danger of displacement.

As aforesaid, the preferred embodiment of the invention comprises a two-sided, pressure sensitive tape over one surface of which is applied a conductive foil sheet or strip of greater width than the pressure sensitive tape, the peripheral edges of the foil sheet being folded upwardly over the longitudinal edges of the pressure sensitive tape to provide longitudinal conducting surfaces along each lateral edge thereof. When the improved shielding tape is applied about a conducting wire, for example, it should be so spirally wound thereabout that the peripheral conducting surfaces adjacent the adhesive inner surface make continuous contact with the outer foil surface of the shielding tape to provide a continuous conducting shield about the wire.

It is therefore a primary object of this invention to evolve an improved shielding tape which may be adhesively applied about any object to be shielded from outside electrical disturbances and which when once applied thereto will remain permanently in proper position thereon.

Another object of this invention is to provide such a shielding tape which is of light weight and comparatively high mechanical and electrical strength.

A further object of the invention is to evolve such a shielding material which may be readily and rapidly applied to any surface to be shielded and which will provide a complete and perfect electrical shield therefor.

Other and further objects of this invention will become apparent as this specification proceeds.

Referring to the drawings.

Figure 3:
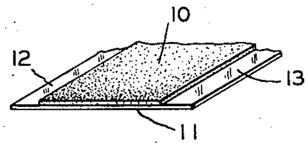
Fig. 3 is a cross-sectional perspective view of the pressure sensitive tape applied to a metal foil strip, the edges of the foil strip extending laterally beyond the edges of the pressure sensitive tape.

In the drawings, 10 indicates a pressure sensitive tape coated on both sides with an adhesive substance, which forms the base for one of the preferred embodiments of the invention. Foil strip 11 is shown and may be of any of the common metals, i. e., silver, copper or aluminum. Foil strip 11 is preferably of greater width than the tape 10, as shown in Fig. 3. The pressure sensitive tape 10 may be of any well known type coated on both surfaces with an adhesive substance, for example, common adhesive tape, masking tape or even tapes of the "Scotch" type which are of plastic composition. The metal foil is preferably .001 inch in thickness but may be of heavier or lighter weight depending upon the nature of the shielding problem involved.

Figure 1:
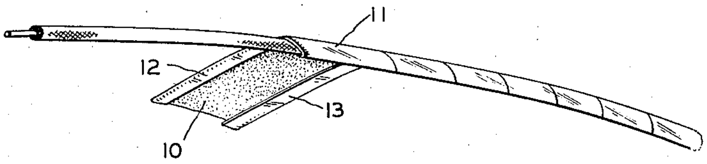
Fig. 1 is a perspective view of a length of the improved shielding tape applied about an electrical conductor.
Figure 2:
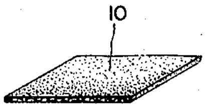
Fig. 2 is a cross-sectional perspective view of a portion of the pressure sensitive tape, both sides of which are coated with an adhesive.
Figure 4:
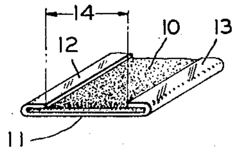
Fig. 4 is a cross-sectional perspective view of the metal foil-tape strip with the edges of the foil strip folded over the edges of the adhesive tape.

In producing the embodiment of the the shielding tape shown in Figs. 2, 3 and 4 an elongate strip of the metal foil 11 may be laid flat on a plane surface, after which a strip of the adhesive tape 10 of the same length may be applied centrally and longitudinally of the foil strip 11 in such fashion that peripheral edges 12 and 13 of foil strip 11, which is of greater width than adhesive strip 10, extend outwardly beyond the lateral edges of adhesive strip 10. Adhesive strip 10, which is adhesively coated on both faces, is then pressed firmly downwardly against foil strip 11 into close cohesive contact therewith. After this initial cohesion between adhesive strip 10 and foil strip 11 has been made the outwardly extending lateral extremities 12 and 13 of foil strip 11 are bent upwardly against the peripheral edges of adhesive strip 10 and are then forced downwardly thereover into close adhesive contact therewith, as shown in Fig. 4, leaving an effective adhesive surface 14 between foil lines 12 and 13. A foil-adhesive strip is thus formed in which the entire outer surface of the strip is composed of the metal foil reinforced by the adhesive strip and the inner or upper surface thereof consists of a wide adhesive band 14 extending the length of the strip, the longitudinal edges of which are covered by conducting foil strips 12 and 13. A mechanically strong foil tape is thus evolved which is provided along one of its surfaces with a wide adhesive band 14 by means of which the tape may be permanently applied to any surface requiring electrical shielding.

Figure 5:
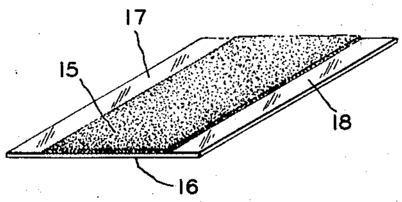
Fig. 5 is a cross-sectional perspective view of a metal foil strip with a pressure sensitive plastic directly applied down the longitudinal median line of one surface, the edges of the foil strip extending outwardly beyond the adhesive.
Figure 6:
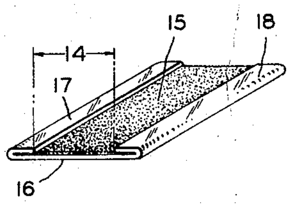
Fig. 6 is a cross-sectional perspective view of this embodiment of the invention with the edges of the foil strip folded around the longitudinal edges of the pressure sensitive plastic applied thereto.

An alternative embodiment of the compound shielding tape is shown in Figs. 5 and 6. In this embodiment of the invention a layer of pressure sensitive plastic 15 is applied longitudinally of the median line of a strip of metal foil 16 in such fashion that peripheral foil edges 17 and 18 extend outwardly an appreciable distance beyond the lateral edges of the pressure sensitive plastic coating 15. In this embodiment of the invention many different types of adhesive material may be used and may be applied directly by spraying, brushing or by any other well known method of application. A preferred adhesive material is a polymer of vinyl ethyl ether mixed to the proper degree of tackiness in a solvent such as common mineral spirits until the desired viscosity is obtained. This adhesive may be applied to the foil in rapid motion and its adhesive qualities may be controlled during application.

In this embodiment of the invention the lateral extremities 17 and 18 of foil strip 16 may be left free as shown in Fig. 5 or may be folded up and over the peripheral edges of the layer of pressure sensitive plastic, as shown in Fig. 6. The latter embodiment is preferred, though the "open" type shown in Fig. 5 provides a most effective and efficient shielding tape.

Figure 7:
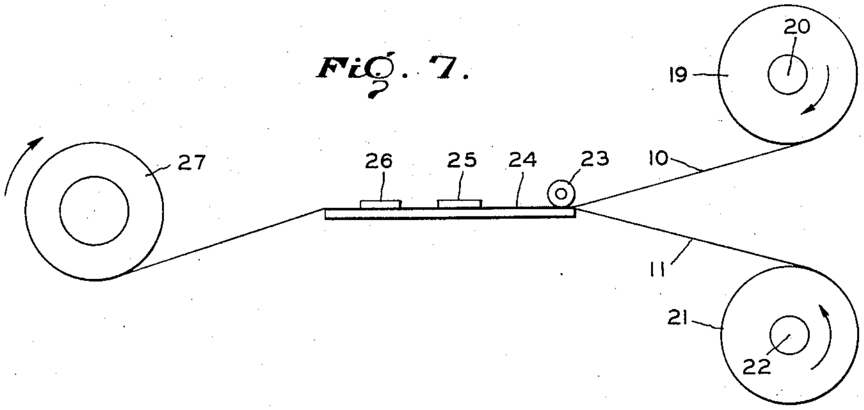
Fig. 7 is a schematic view of one manner of forming the shielding tape in a continuous process from master rolls of pressure sensitive tape and metal foil.

Fig. 7 is a schematic showing of one method of forming the compound shield tape shown in Fig. 4 of the drawing. In forming the compound tape by this method a large roll 19 of pressure sensitive tape is preferably mounted on axle 20 above a roll 21 of metal foil mounted in the same vertical plane on axle 22, the foil being of greater width than the pressure sensitive tape. The extremities of the tape 10 and foil 11 are then joined, as shown in Fig. 3, and are passed under a pressure roller 23 bearing against a plane surface 24. The strip is then passed between successive folding dies 25 and 26 on plane surface 24, wherein the peripheral edges of the foil strip 11 are folded over the peripheral edges of the pressure sensitive tape 10. The completed tape is then passed to a driven storage roller 27 upon which it is wound and which acts to pull the pressure sensitive tape and foil from their respective rollers 19 and 21 under the pressure roller 23 and through folding dies 25 and 26. The pressure roller 23 working against the table 24 completes the initial cohesive contact between the lower surface of the pressure sensitive tape 10 and the upper surface of the metal foil strip 11 and the folding dies 25 and 26 fold up the peripheral edges of the foil strip 11 over the lateral edges of the pressure sensitive tape 10 to complete the compound shielding tape.

The pressure sensitive tape-foil strip shown in Fig. 4 is of higher mechanical strength than the adhesively coated foil strip shown in Figs. 5 and 6, but is proportionately more expensive to manufacture. The embodiment shown in Figs. 5 and 6 may be very rapidly formed and provides a highly impervious electrical shielding material of considerable mechanical strength.

The provision of the peripheral metal strips 12—13 and 17—18 enables the evolution of a perfect electrical and mechanical contact with the metal surfaces of the compound tape during the application thereof to the surface to be shielded thereby. The peripheral metal contact strips are vitally important. If the contact strips do not make contact, or if they were not provided, the entire compound tape wrapping instead of acting as a shield would act as an inductance, each turn amounting to the turn of a coil. Thus, under certain conditions of use the entire wrapping might become resonant and the tape would not perform its shielding function.

As has been heretofore stated, a wide variety of pressure sensitive tapes and foils may be used in the production of the novel compound shielding tape shown in Figs. 3 and 4. The pressure sensitive tape fulfills the dual function of providing an adhesive surface for the compound tape to maintain it properly in position and also acts as a mechanical strengthener or backing for the metal foil strip, providing increased strength for the tape-foil structure.

In applying the compound shielding tape to surfaces to be shielded care must be taken to insure that the peripheral foil lines on the adhesive surface of the tape bear against a metal surface of the tape to maintain a continuous metal conducting surface about the outer surface of the structure being shielded. Any lack of such contact would destroy the conductivity of the shield and would result in malfunctioning.

A small metal ferrule may be provided at the extremity of the tape wrapping to assist in grounding the wrapping.

Where a body other than cylindrical is wrapper with the tape care again must be taken to insure that the metal peripheral strips on the adhesive face thereof at all times contact a metal surface of the tape.

Modifications may be made in this tape structure without departing from the spirit of this invention. A wide variety of adhesive tapes and adhesives may be used and foils of any desired weight may be used.

In both modifications of the tape the peripheral edges of the coil strip may be maintained in extended position rather than folded back over the edges of the adhesive strip, as shown in Figs. 3 and 5. A tape so formed will provide a perfect electrical shield of slightly lower mechanical strength than the embodiments shown in Figs. 4 and 6.

A variety of methods may be used to form this composite sealing strip, only one of which has been schematically illustrated in Fig. 7 and described in the specification.

Attention is directed to the appended claim for a limitation of the scope of this invention.

What is claimed is:

In an improved shielding tape, an adhesive tape provided with adhesive on both upper and lower surfaces, a metal foil strip of greater width than said adhesive tape closely applied to the lower adhesive surface of said adhesive tape and extending outwardly beyond the lateral edges thereof an appreciable distance whereby the edges of said foil strip continuously contact a surface of said foil strip when the tape is spirally wound in overlap about a member to be shielded.

References Cited in the file of this patent

UNITED STATES PATENTS

| | | |
|---|---|---|
| 1,320,692 | Hulse | Nov. 4, 1919 |
| 2,030,135 | Carpenter | Feb. 11, 1936 |
| 2,049,030 | Strauss | July 28, 1936 |
| 2,106,133 | Goldman | Jan. 18, 1938 |
| 2,191,704 | Bennett | Feb. 27, 1940 |
| 2,444,830 | Kellgren et al. | July 6, 1948 |
| 2,755,196 | Scholl | July 17, 1956 |